(12) United States Patent
Yin et al.

(10) Patent No.: US 8,130,304 B2
(45) Date of Patent: Mar. 6, 2012

(54) IMAGE SENSORS WITH PIXEL CHARGE SUMMING

(75) Inventors: Zhiping Yin, Boise, ID (US); John W. Ladd, San Jose, CA (US)

(73) Assignee: Aptina Imaging Corporation, George Town (KY)

( * ) Notice: Subject to any disclaimer, the term of this patent is extended or adjusted under 35 U.S.C. 154(b) by 357 days.

(21) Appl. No.: 12/509,398

(22) Filed: Jul. 24, 2009

(65) Prior Publication Data

US 2011/0019051 A1  Jan. 27, 2011

(51) Int. Cl.
*H04N 5/335* (2011.01)
*H01L 31/062* (2012.01)
*H01L 27/00* (2006.01)

(52) U.S. Cl. ............ 348/308; 348/273; 250/208.1; 257/292

(58) Field of Classification Search ............ 348/294, 348/302, 308, 272, 273, 280, 300, 311; 257/292; 250/208.1
See application file for complete search history.

(56) References Cited

U.S. PATENT DOCUMENTS

| 5,999,661 | A | 12/1999 | Oster et al. | |
|---|---|---|---|---|
| 6,107,655 | A * | 8/2000 | Guidash | 257/292 |
| 6,614,553 | B2 | 9/2003 | Nakami et al. | |
| 6,992,714 | B1 * | 1/2006 | Hashimoto et al. | 348/273 |
| 7,256,381 | B2 * | 8/2007 | Asaba | 250/208.1 |
| 7,283,679 | B2 | 10/2007 | Okada et al. | |
| 7,515,186 | B2 | 4/2009 | Moini et al. | |
| 7,663,680 | B2 * | 2/2010 | Hashimoto et al. | 348/302 |
| 2001/0026321 | A1 * | 10/2001 | Goto | 348/302 |
| 2005/0083544 | A1 | 4/2005 | Kondoh | |
| 2008/0062290 | A1 * | 3/2008 | Lahav et al. | 348/280 |
| 2008/0136933 | A1 * | 6/2008 | Dosluoglu et al. | 348/272 |
| 2008/0273105 | A1 * | 11/2008 | Tanaka et al. | 348/301 |
| 2009/0066782 | A1 * | 3/2009 | Choi et al. | 348/25 |
| 2009/0173974 | A1 * | 7/2009 | Shah et al. | 257/292 |

FOREIGN PATENT DOCUMENTS

| WO | 00/60532 A1 | 10/2000 |
|---|---|---|
| WO | 03/001567 A2 | 1/2003 |

OTHER PUBLICATIONS

Smith et al., U.S. Appl. No. 12/480,658, filed Jun. 8, 2009.

* cited by examiner

*Primary Examiner* — Nhan T Tran
(74) *Attorney, Agent, or Firm* — Treyz Law Group; G. Victor Treyz; David C. Kellogg

(57) ABSTRACT

An image sensor has an array of pixels of different colors. The pixels may be arranged in a repeating pattern of eight pixels having four rows and two columns. During charge summing operations, the first and third rows may share a floating diffusion and the second and fourth rows may share a floating diffusion. When charge summing is inactive, transfer gates in the first and second columns may be controlled independently, while transfer gates in pairs of rows may be controlled simultaneously. When charge summing is active, summed charges from pixels of the same color in the first and third rows may be placed on the floating diffusion shared by the first and third rows and summed charges from pixels of the same color in the second and fourth rows may be placed on the floating diffusion shared by the second and fourth rows.

17 Claims, 5 Drawing Sheets

IMAGE SENSORS WITH PIXEL CHARGE SUMMING

BACKGROUND

The present invention relates to image sensors and, more particularly, to image sensors in which pixel signals can be selectively summed to increase low light signals.

Modern electronic devices such as cellular telephones, cameras, and computers often use digital image sensors. Image sensors are formed from pixels. Pixels may be arranged in a two-dimensional array of rows and columns. The pixels contain photodiodes that convert incoming light into electrical charge. The amount of charge that is produced by each pixel is proportional to the amount of light received by that pixel. By measuring the amount of charge produced by each of the pixels in an image sensor, a digital image can be constructed.

Charge summing arrangements are sometimes used in image sensors to improve signal strength. When charge summing is enabled, the amount of charge that is produced by a number of pixels is added together. Because more than one pixel contributes to the signal, image sensor resolution is decreased. Nevertheless, the process of combining charge from more than one pixel increases the signal-to-noise ratio and thereby improves image quality at low light levels.

Image sensors typically include a charge storage node called a "floating diffusion." Charge that has been produced by the photodiode in a pixel can be stored on the floating diffusion before being read out by readout circuitry in the sensor. In image sensors with charge summing capabilities, the charge from multiple photodiodes is summed on a common floating diffusion.

One figure of merit for image sensors is the so-called "conversion gain" of the sensors' pixels. Conversion gain is a measure of how efficiently voltage changes are produced on a floating diffusion in response to the production of charge on a photodiode. Conversion gain is typically defined as the number of volts produced per electron in a pixel (typically presented in units of $\mu V/e^-$). Sensors that exhibit poor conversion gain tend to produce images that are of lower quality than sensors that exhibit high conversion gain.

Although it is often desirable to provide an image sensor with charge summing capabilities so that the image sensor can handle low-light imaging tasks, care should be taken to ensure satisfactory conversion gain. Conventional charge summing arrangements may add undesirable excess capacitance to the floating diffusion, which can adversely affect conversion gain.

It would therefore be desirable to provide image sensors with improved charge summing capabilities.

DETAILED DESCRIPTION

Figure 1:
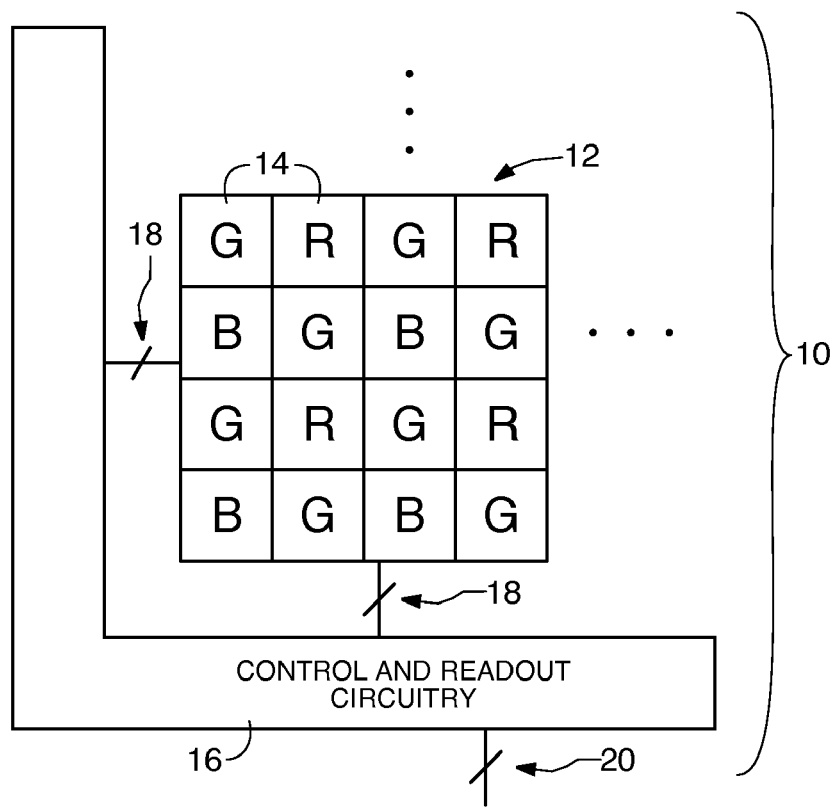
FIG. 1 is a diagram of an illustrative image sensor with charge summing capabilities in accordance with an embodiment of the present invention.

Modern electronic devices such as cellular telephones, cameras, and computer often use digital image sensors. An illustrative image sensor is shown in FIG. 1. As shown in FIG. 1, image sensor 10 may include light-sensitive pixels 14. Pixels 14 may be arranged in an array such as array 12. In the example of FIG. 1, array 12 has perpendicular rows and columns. If desired, pixels 14 may also be arranged in patterns in which groups of pixels run diagonally. For clarity, arrangements in which pixels 14 are arranged in horizontal rows and vertical columns are sometimes described herein as an example.

Control and readout circuitry 16 may be coupled to pixel array 12 using conductive lines such as paths 18. Paths 18 may be used to convey control signals from circuitry 16 to transistors in array 12 and may be used to convey image sensor signals from the floating diffusions of pixels 14 to readout circuits in circuitry 16. In a typical arrangement, control and readout circuitry 16 is formed on the same semiconductor die as array 12, but arrangements in which circuitry 16 and pixel array 14 are formed as parts of separate integrated circuits may also be used if desired. The readout circuitry in control and readout circuitry 16 may include sample-and-hold detectors or other circuits that are capable of making accurate measurements of relatively small signals.

After making measurements of the pixel signals in array 12, readout circuitry 16 may supply image signals to downstream circuitry using path 20. This downstream circuitry may include, for example, a processor in a camera or other device that performs image processing operations, manages image file storage tasks, etc.

Image sensor array 12 may include a color filter array or other structure that imparts a particular color to each pixel. The color of the color filter for each pixel determines the part of the light spectrum to which that pixel responds. Pixels with blue color filters respond to blue light, pixels with red color filters respond to red light, and pixels with green color filters respond to light in the green portion of the spectrum. An illustrative color filter pattern that may be used for image sensor 12 is the so-called Bayer pattern of FIG. 1. With a Bayer pattern, rows of green and red pixels alternate with rows of blue and green pixels. Non-Bayer patterns may also be used if desired. The Bayer pattern shown in FIG. 1 is merely illustrative.

Figure 2:
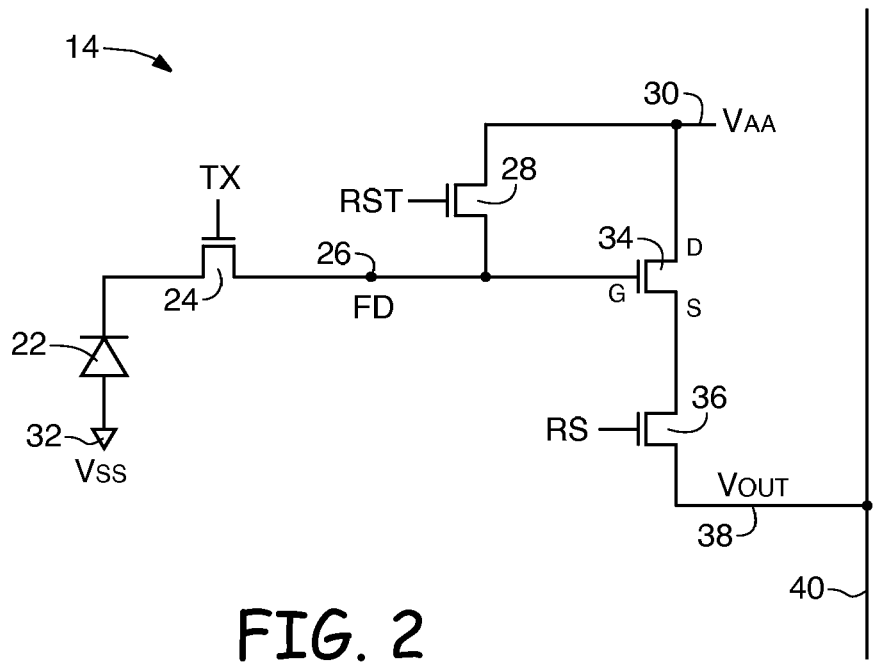
FIG. 2 is a diagram of an illustrative pixel in an image sensor in accordance with an embodiment of the present invention.

Circuitry in an illustrative pixel is shown in FIG. 2. As shown in FIG. 2, pixel 14 includes a photosensitive element such as photodiode 22. A positive power supply voltage (e.g., voltage Vaa) may be supplied at positive power supply terminal 30. A ground power supply voltage (e.g., Vss) may be supplied at ground terminal 32. Incoming light is collected by photodiode 22 after passing through a color filter structure. Photodiode 22 converts the light to electrical charge.

Before an image is acquired, reset control signal RST may be asserted. This turns on reset transistor 28 and resets charge storage node 26 (also referred to as floating diffusion FD) to Vaa. The reset control signal RST may then be deasserted to turn off reset transistor 28. After the reset process is complete, transfer gate control signal TX may be asserted to turn on transfer transistor (transfer gate) 24. When transfer transistor 24 is turned on, the charge that has been generated by photodiode 22 in response to incoming light is transferred to charge storage node 26. The signal associated with the stored charge on node 26 is conveyed to row select transistor 36 by source-follower transistor 34. When it is desired to read out the value of the stored charge (i.e., the value of the stored charge that is represented by the signal at the source S of transistor 34), row select control signal RS can be asserted. When signal RS is asserted, transistor 36 turns on and a corresponding signal Vout that is representative of the magnitude of the charge on charge storage node 26 is produced on output path 38. In a typical configuration, there are numerous rows and columns of pixels such as pixel 14 in array 12. A vertical conductive path such as path 40 can be associated with each column of pixels. When signal RS is asserted in a given row, path 40 can be used to route signal Vout from that row to readout circuitry 16.

Charge storage node 26 may be implemented using a region of doped semiconductor (e.g., a doped silicon region formed in a silicon substrate by ion implantation, impurity diffusion, or other doping techniques). The doped semiconductor region (i.e., the floating diffusion FD) exhibits a capacitance that can be used to store the charge that has been transferred from photodiode 22. To ensure good conversion gain for pixel 14, it is generally desirable for the magnitude of the capacitance (mainly composed of floating diffusion capacitance and parasitic capacitance from metal connections that are associated with floating diffusions and which couple floating diffusions to each other) to be matched with the number of photoelectrons that can be held in a photodiode. Excessive capacitance values for the floating diffusion in a pixel can lead to undesirably low conversion gain values.

With conventional pixel summing arrangements, the layout that is used for the floating diffusion places a lower limit on the capacitance for the floating diffusion. This can make the conversion gain in image sensors with conventional pixel summing arrangements undesirably low. As an example, consider the arrangement of FIG. 3. Circuitry 42 of FIG. 3 corresponds to a 1×4 section of a conventional image sensor in which a 1×4 four-way sharing (4ws) scheme has been used to implement charge summing. Circuitry 42 includes green pixels 44 and 48 and blue pixels 46 and 50. The remainder of the array (which is not shown in FIG. 3) contains red pixels and additional green and blue pixels arranged in a Bayer pattern.

To implement charge summing, the charge that is produced by green pixel 44 is summed with the charge produced by green pixel 48. Similarly, the charge from blue pixels 46 and 50 may be summed. Pairs of red pixel signals are summed in the same way. To avoid over-complicating the drawing in FIG. 3, only the circuitry that is being used to implement green and blue pixel summing is shown.

Figure 3:
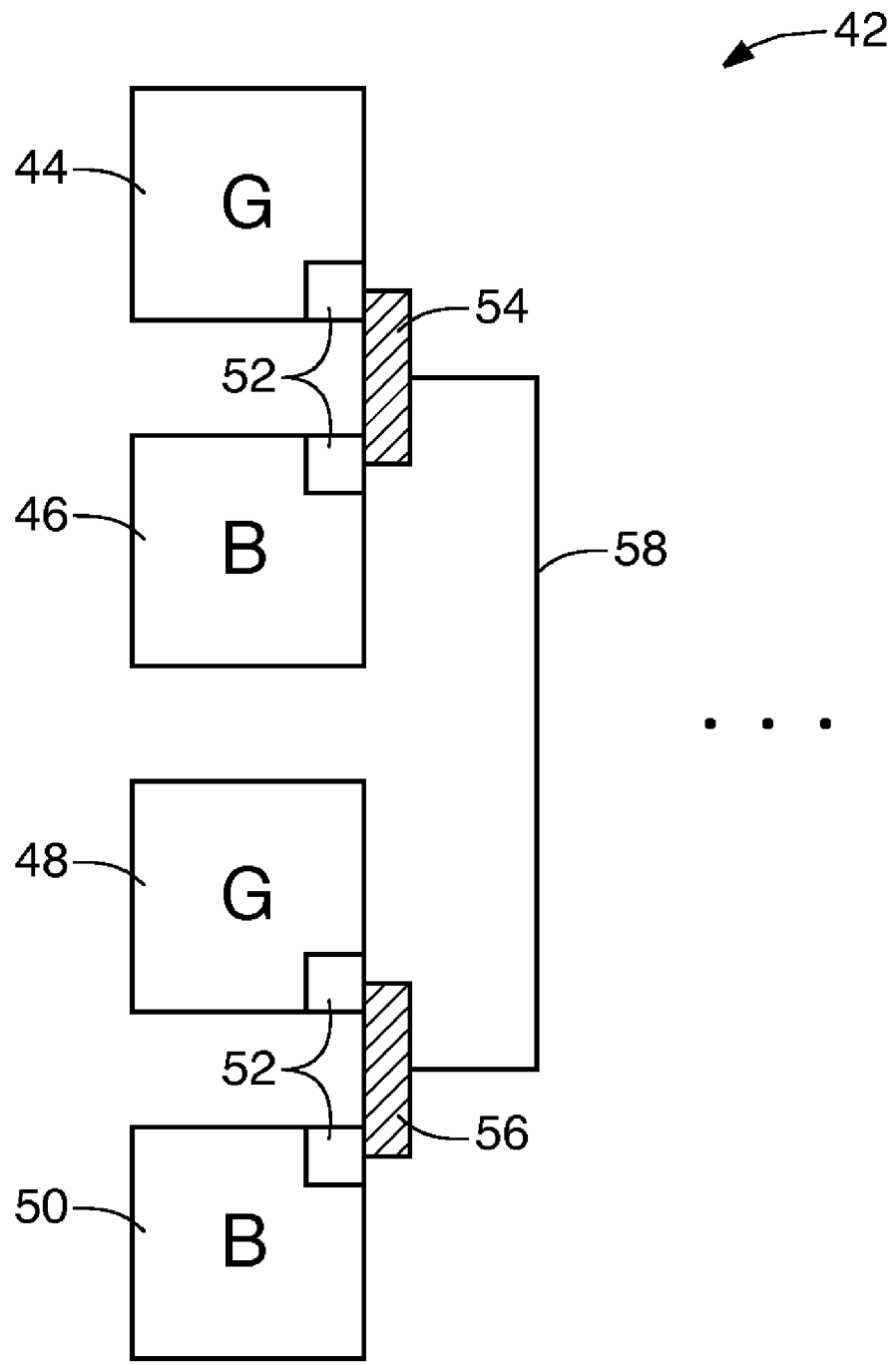
FIG. 3 is a diagram of a conventional image sensor array pattern that may be used to implement a 1×4 charge summing configuration.

Each pixel in circuitry 42 includes a photodiode, a transfer transistor, a reset transistor, a source follower transistor, and a row select transistor. In the diagram of FIG. 3, gates 52 represent the control gates of the transfer transistors. These gates are interposed between the photodiodes in the pixels and corresponding floating diffusions 54 and 56. As shown in FIG. 3, floating diffusion 54 is shared between pixel 44 and pixel 46, whereas floating diffusion 56 is shared between pixel 48 and pixel 50. Metal interconnect 58 is used to electrically connect floating diffusion 54 to floating diffusion 56. When pixel summing is desired, charge from green pixels 44 and 48 may be transferred to floating diffusions 54 and 56 in parallel. Because of the presence of metal interconnect line 58, the charge on floating diffusions 54 and 56 is summed. In a separate operation, charge from blue pixels 46 and 50 can be summed in the same way. Although the layout of FIG. 3 allows signal strength to be improved by charge summing, the area consumed by floating diffusions 54 and 56 and the metal connections between floating diffusions 54 and 56 is relatively large. This limits the minimum capacitance associated with the combined floating diffusion formed by diffusions 54 and 56 and metal line 58 between floating diffusions and thereby reduces conversion gain.

Figure 4:
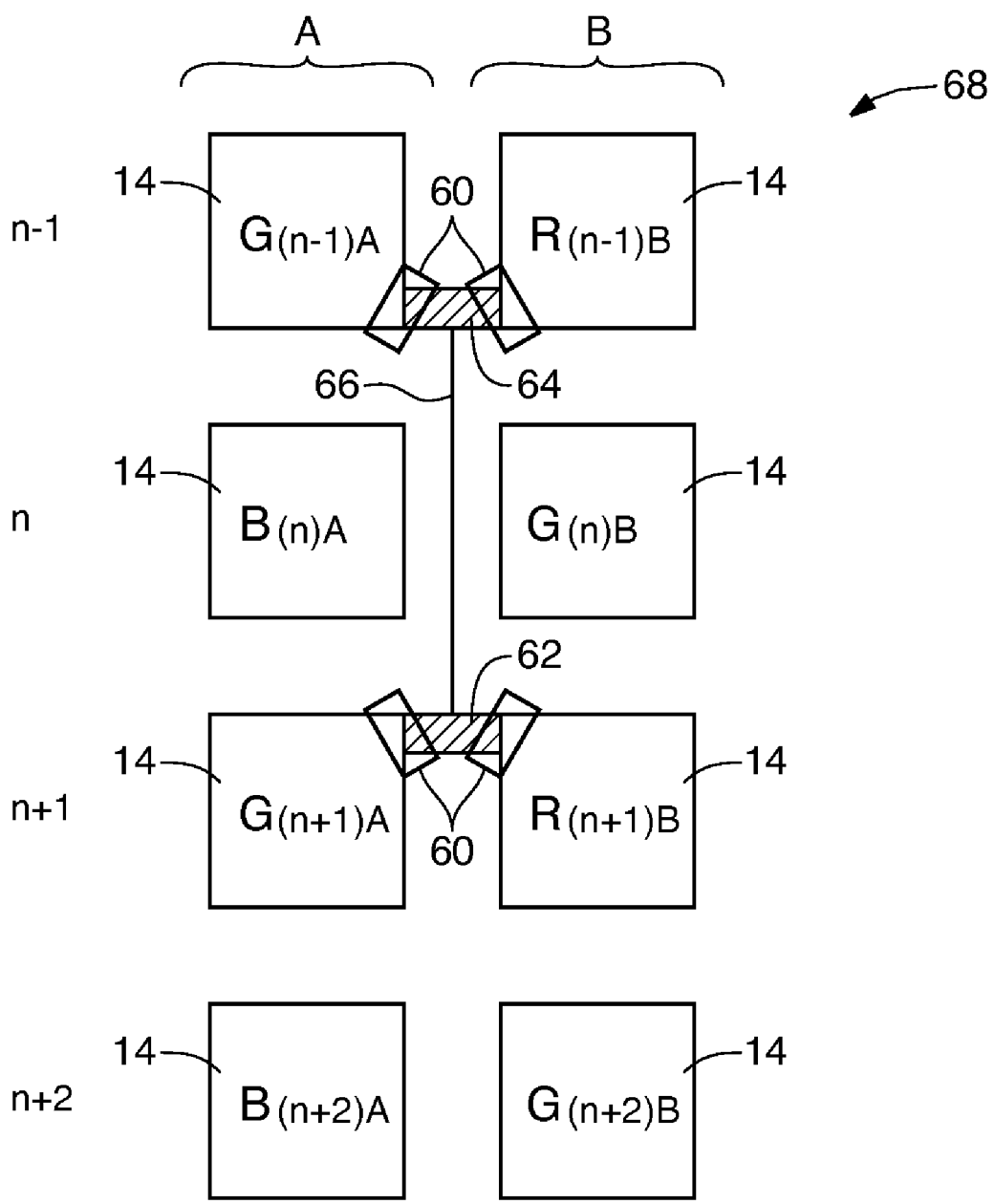
FIG. 4 is a diagram of a portion of an image sensor array that may be used to implement charge summing in accordance with an embodiment of the present invention.

This shortcoming of conventional charge sharing configurations can be addressed using an arrangement of the type shown in FIG. 4. Circuitry 68 of FIG. 4 represents a portion of an image sensor array 12. Four rows and two columns of pixels 14 are shown. The rows are labeled n−1, n, n+1, and n+2. A first column (column A) includes green and blue pixels 14. A second column (column B) includes red and green pixels. Metal lines such as line 66 are used to connect floating diffusions such as floating diffusions 64 and 62. Although only one metal line 66 is shown in FIG. 4, there is another metal line and another pair of floating diffusions in circuitry 68. These components, which are not shown in FIG. 4 to avoid over-complicating the drawing, are used to connect the pixels in the second row and the pixels in the fourth row. In particular, there is a floating diffusion (not shown in FIG. 4) that is interposed between the blue and green pixels of the second row and there is a floating diffusion (not shown in FIG. 4) that is interposed between the blue and green pixels of the fourth row. Gates 60 are associated with transfer transistors such as transfer transistor 24 of FIG. 2.

With layouts of the type shown in FIG. 4, it is possible to reduce the capacitance associated with conversion gain. The areas of floating diffusions 64 and 62 can, for example, be smaller than the areas of conventional floating diffusions 54 and 56 and metal connection 66 can be shorter than the conventional metal connection 58 of FIG. 3. As a result, the conversion gain for image sensors that use charge sharing arrangements of the type shown in FIG. 4 can be superior to the conversion gain of image sensors that use conventional charge sharing arrangements of the type shown in FIG. 3.

Figure 5:
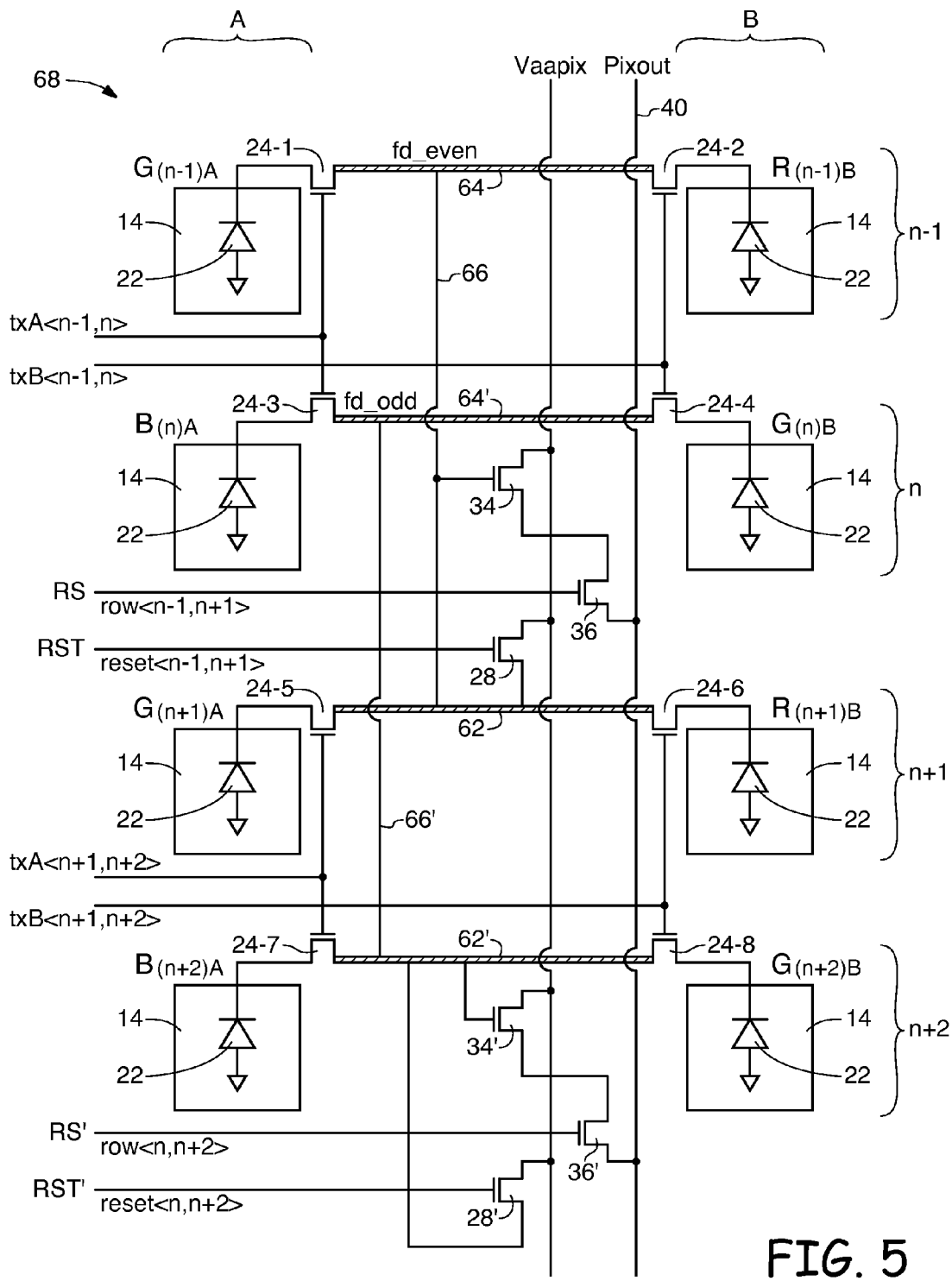
FIG. 5 is a more detailed circuit diagram of the image sensor pattern shown in FIG. 4 in accordance with an embodiment of the present invention.

Circuitry 68 is shown in more detail in FIG. 5. As shown in FIG. 5, the eight-pixel pattern of circuitry 68 has four floating diffusions: floating diffusions 64, 64', 62, and 62'. Floating diffusions 64 and 64' are connected by metal interconnect line 66 and are sometimes referred to as the "even" floating diffusion fd_even during charge summing operations. Floating diffusions 62 and 62' are connected by metal interconnect line 66' and are sometimes referred to as the "odd" floating diffusion fd_odd during charge summing operations.

Each pixel 14 has an associated transfer transistor that controls charge transfer from its photodiode 22 to a corresponding floating diffusion. Transfer control signal TXA<n−1,n> is used to control the transfer transistors 24-1 and 24-3. Transfer control signal TXB<n−1,n> is used to control transfer transistors 24-2 and 24-4. Transfer control signal TXA<n+1,n+2> is used to control transfer gates 24-5 and 24-7. Transfer control signal TXB<n+1,n+2> is used to control transfer gates 24-6 and 24-8.

The first and third rows of circuitry 68 (i.e., the "even" rows in this example) share source follower transistor 34, reset transistor 28, and row select transistor 36, whereas the second and fourth rows of circuitry 68 (i.e., the "odd" rows in this example) share source follower transistor 34', reset transistor 28', and row select transistor 36'. Row select transistor 36 is controlled by the row select signal on line RS, whereas row select transistor 36' is controlled by the row select signal on line RS'. Reset transistor 28 is controlled by the reset signal on line RST, whereas reset transistor 28' is controlled by the reset signal on line RST'. Reset operations can be performed on a global basis (i.e., when a global shutter scheme is being used) or may be performed on a row-by-row basis (i.e., when implementing a rolling shutter scheme).

During operation of image sensor 10, control and readout circuitry 16 may operate sensor 10 and array 12 in a mode in which charge summing (sharing) is active or in a mode in which charge summing (sharing) is inactive. In a typical scenario, a manually adjusted setting or an automatically adjusted setting is used to turn charge summing on in low light conditions (where low noise is desirable) and is used to turn charge summing off in higher light conditions (where maximum resolution is desirable).

When charge summing is inactive, circuitry 16 asserts transfer transistor control signal TXA<n−1,n> to transfer charge onto floating diffusion 64 and floating diffusion 64' from green pixel $G_{(n-1)A}$ and blue pixel $B_{nA}$, respectively. Control circuitry 16 then uses row select signal row<n−1,n+1> to read out the charge from floating diffusion 64—i.e., the green pixel $G_{(n-1)A}$—and uses row select signal row <n,n+2> to read out the signal from floating diffusion 64'—i.e., the blue pixel $B_{nA}$. After reading out the floating diffusion charge values for green pixel $G_{(n-1)A}$ and blue pixel $B_{nA}$ in column A, control circuitry 16 may read out the values from the red and green pixels in row n−1 and row n in column B. In particular, control circuitry 16 may assert the TXB<n−1,n> signal to transfer charge from pixel $R_{(n-1)B}$ to floating diffusion 64 and to simultaneously transfer charge from green pixel $G_{(n)B}$ to floating diffusion 64'. Circuitry 16 may then use row select signal row<n−1,n+1> to read out the charge from floating diffusion 64—i.e., the red pixel $R_{(n-1)B}$—and may use row select signal row <n,n+2> to read out the signal from floating diffusion 64'—i.e., the green pixel $G_{nB}$. The charge transfer process for gathering the individual pixel signals from pixels $G_{(n+1)A}$, $B_{(n+2)A}$, $R_{(n+1)B}$, and $G_{(n+2)B}$ proceeds in the same fashion.

When charge summing is active, circuitry 16 asserts transfer transistor control signal TXA<n−1,n> to transfer charge onto floating diffusion 64 (i.e., fd_even) from green pixel $G_{(n-1)A}$ and while simultaneously transferring charge onto floating diffusion 64' (fd_odd) from blue pixel $B_{nA}$. At the same time that circuitry 16 asserts control signal TXA<n−1,n>, circuitry 16 asserts transfer transistor control signal TXA<n+1,n+2> to transfer charge from green pixel $G_{(n\ 1)A}$ to the same floating diffusion (fd_even) as the charge from green pixel $G_{(n-1)A}$. In this way, the charges from the green pixels in rows n−1 and n+1 of the first column are summed on floating diffusion fd_even. This operation simultaneously places a summed charge from blue pixels $B_{nA}$ and $B_{(n+2)A}$ on floating diffusion fd_odd. After the summed charges have been transferred onto the fd_even and fd_odd floating diffusions, circuitry 16 may use row select signal row<n−1,n+1> to read out the charge from floating diffusion fd_even (i.e., the summed green pixel charge) and may use row select signal row <n,n+2> to read out the charge from floating diffusion fd_odd (i.e., the summed blue pixel charge). Processing in column B proceeds with the same pattern: a summed red pixel charge is gathered from the pair of red pixels in column B on the fd_even floating diffusion while a summed green pixel charge is gathered from the pair of green pixels in column B on the fd_odd floating diffusion. The row select signals are then asserted to separately read out these summed signals.

Pixel arrays with charge summing circuitry of this type may be arranged so that groups of pixels run diagonally rather than horizontally and vertically. The pixels along the diagonal in this type of array may alternate in a green, red, green, blue pattern. Transistors such as the reset, source follower, and row select transistors of FIG. 2 may be shared between groups of pixels. In diagonal array layouts such as these, charge summing may be implemented between vertically adjacent pixels of the same color (i.e., two red pixels that are vertically adjacent to each other, two blue pixels that are vertically adjacent to each other, etc.).

Various embodiments have been described illustrating image sensors with charge summing. Pixels may be arranged in an array in which charge storage nodes are shared between alternating rows. For example, an even floating diffusion may be used to sum charge from pixels in even rows of a sensor array and an odd floating diffusion may be used to sum charge from pixels in odd rows of a sensor array. When charge summing is inactive, charge may be simultaneously transferred onto the even and odd floating diffusion nodes and may then be read out in two respective operations. When charge summing is active, a pair of pixel charges from pixels of a first color may be summed on the even floating diffusion while a pair of pixel charges from pixels of a second color are simultaneously summed on the odd floating diffusion. First and second row select operations may then be performed to read out these respective summed charges.

Figure 6:
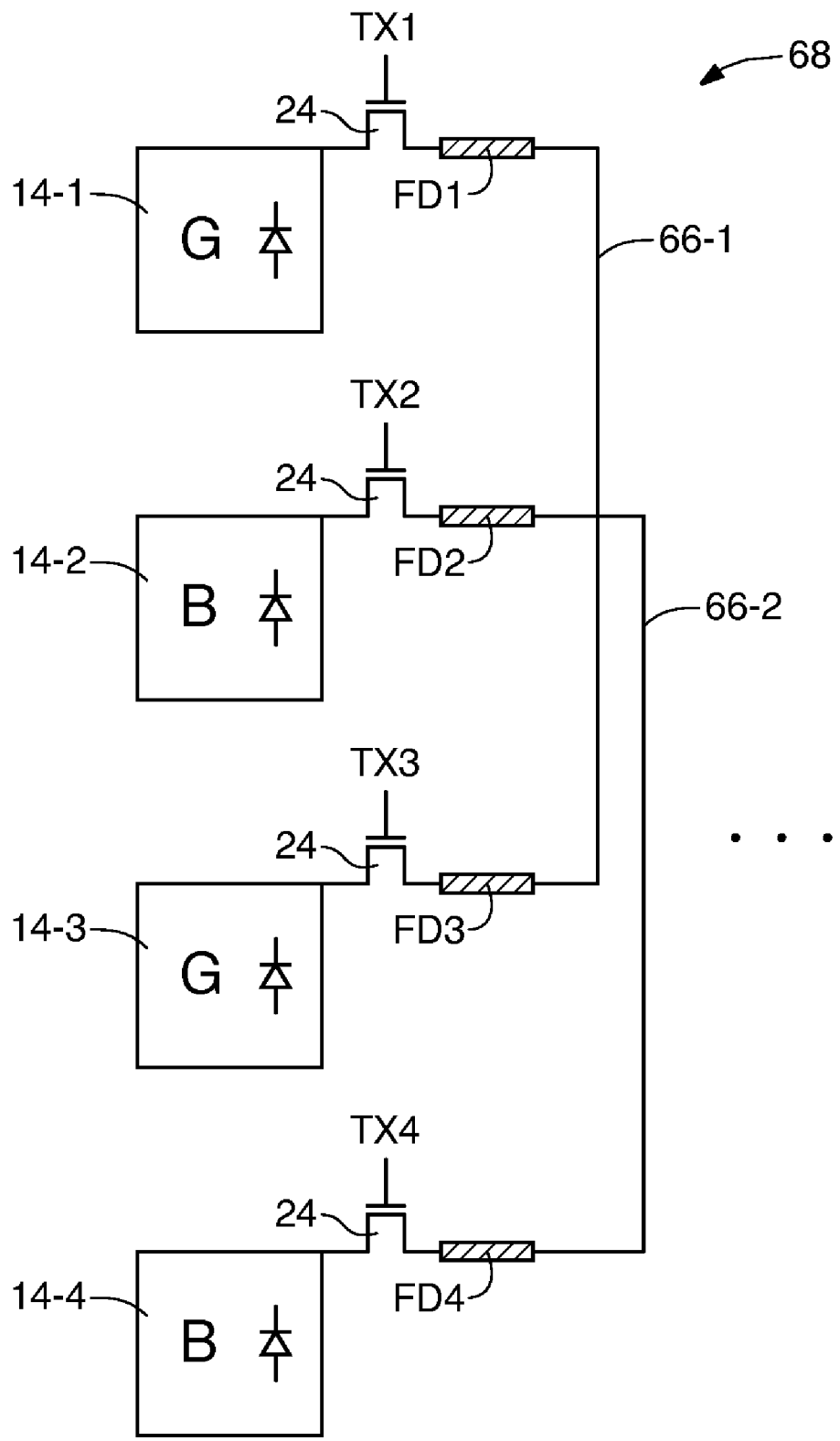
FIG. 6 is a diagram showing how an image sensor may include circuitry for implementing a charge summing arrangement in accordance with an embodiment of the present invention.

If desired, charge summing configurations may be used in which pixels in alternate (skipping) rows are operated either individually (no charge summing) or in a shared mode (charge summing). An example of this type of arrangement is shown in FIG. 6. Image sensor circuitry 68 of FIG. 6 represents a portion of image sensor 12. Only two different colors of pixels are shown in FIG. 6 (green and blue). Additional rows and columns of circuitry in image sensor 12 may include pixels of other colors (e.g., circuitry for red and green pixels in a configuration in which the pixels are arranged in a Bayer pattern). Moreover, each pair of identically colored pixels in alternating rows shares a source-follower transistor, reset transistor, and row select transistor as described in connection with FIG. 5. For example, the two green pixels of FIG. 6 share a source-follower, a reset transistor, and a row select transistor. Similarly, the two blue pixels in FIG. 6 share a source-follower transistor, a reset transistor, and a row select transistor. These transistors are not shown in FIG. 6 to avoid overcomplicating the drawing.

In pixel summing arrangements of the type shown in FIG. 6, each pixel has an associated floating diffusion onto which charge may be transferred using an associated one of transfer gates 24. Green pixel 14-1 has a floating diffusion FD1 to which charge can be transferred by transfer gate TX1. Blue pixel 14-2 has a floating diffusion FD2 to which charge can be transferred by transfer gate TX2. Green pixel 14-3 has a floating diffusion FD3 to which charge can be transferred by transfer gate TX3. Blue pixel 14-4 has a floating diffusion FD4 to which charge can be transferred by transfer gate TX4.

Metal interconnect line 66-1 connects floating diffusions FD1 and FD3 to allow green pixel charge to be selectively summed. Metal interconnect line 66-2 connects floating diffusions FD2 and FD4, so that the blue pixels can be summed. No other pixels are coupled to the floating diffusions. For example, only the pair of green pixels that are shown in FIG. 6 are connected to floating diffusions FD1 and FD3, thereby limiting the maximum capacitance associated with floating diffusions FD1 and FD3 and associated interconnect line 66-1. Similarly, each other charge summing pair has only two associated floating diffusions. In each charge summing pair, each floating diffusion is associated with a respective one of the pixels, is controlled by a respective transfer gate, and is coupled to the other floating diffusion in the charge summing pair by a single metal line. No other pixels are connected to the floating diffusions and metal interconnect of the charge summing pair.

When charge summing is turned off, charge transfer operations for each pixel are controlled independently. For example, charge can be transferred from green pixel 14-1 to floating diffusion FD1 without performing any transfer operations on green pixel 14-3. This is because it is not necessary to turn on transfer gate TX3 when transfer gate TX1 is turned on. When charge summing is enabled, transfer gates TX1 and TX3 are operated together (e.g., by control and readout circuitry 16 of FIG. 1). In particular, transfer gates TX1 and TX3 can be turned on simultaneously during charge transfer operations from the photodiodes in pixels 14-1 and 14-3. When both TX1 and TX3 are asserted at the same time, floating diffusions FD1 and FD3 (which are connected by line 66-1) operate as a shared charge storage node. The charge that has been gathered by green pixel 14-1 in the first row of circuitry 68 in FIG. 6 is therefore summed to the charge that has been gathered by green pixel 14-3 in the third row of circuitry 68 in FIG. 6. The summed charge appears on floating diffusions FD1 and FD3 and interconnect line 66-1. This charge can be read out using the control circuitry that is shared between the green pixels (i.e., the reset transistor, source follower, and row select transistor associated with pixels 14-1 and 14-3). Blue pixels 14-2 and 14-4 can similarly be summed, as can pairs of red pixels in alternating rows.

Because the pixels of the same color lie in alternating rows, the type of pixel summing arrangement that is shown in FIG. 6 is sometimes referred to as "skip-row sharing." Skip-row sharing may, in general, be used in a 1×2 2ws (two-way share) arrangement, a 2×2 4ws (four-way share) arrangement, and other suitable array patterns. The example of FIG. 6 is merely illustrative.

The foregoing is merely illustrative of the principles of this invention which can be practiced in other embodiments.

What is claimed is:

1. An array of image sensing pixels comprising:
first and second pixels in a first row;
third and fourth pixels in a second row;
fifth and sixth pixels in a third row;
seventh and eighth pixels in a fourth row;
a first floating diffusion that is coupled between the first and second pixels;
a second floating diffusion that is coupled between the third and fourth pixels;
a third floating diffusion that is coupled between the fifth and sixth pixels;
a fourth floating diffusion that is coupled between the seventh and eighth pixels;
a first conductive line that connects the first and third floating diffusions; and
a second conductive line that connects the second and fourth floating diffusions,
wherein said first and second conductive lines are not directly shortly together.

2. The array defined in claim 1 wherein each pixel contains a respective photodiode and has a respective transfer transistor that controls charge transfer from that photodiode.

3. The array defined in claim 2 further comprising a transfer transistor control path that simultaneously applies a transfer transistor control signal to the transfer gates of the first and third transistors, wherein the first and third transistors are contained in a common column of the array of image sensing pixels.

4. The array defined in claim 3 further comprising an additional transfer transistor control path that simultaneously applies an additional transfer transistor control signal to the transfer gates of the second and fourth transistors, wherein the second and fourth transistors are contained in an additional column of the array of image sensing pixels.

5. The array defined in claim 1 wherein the first, third, fifth, and seventh pixels are contained in a first column of the array and wherein the second, fourth, sixth, and eighth pixels are contained in a second column of the array that is adjacent to the first column of the array.

6. The array defined in claim 1 further comprising:
a first row select transistor that receives signals from the first conductive line; and
a second row select transistor that receives signals from the second conductive line.

7. The array defined in claim 1 wherein the first and third floating diffusions are electrically connected and form a first charge storage node, wherein the second and fourth floating diffusions are electrically connected and form a second charge storage node, and wherein, during charge summing operations in the array, charge from the first and fifth pixels is summed on the first charge storage node and charge from the third and seventh pixels is summed on the second charge storage node.

8. An array of image sensing pixels comprising:
first and second pixels in a first row;
third and fourth pixels in a second row;
fifth and sixth pixels in a third row;
seventh and eighth pixels in a fourth row;
a first floating diffusion that is coupled between the first and second pixels;
a second floating diffusion that is coupled between the third and fourth pixels;
a third floating diffusion that is coupled between the fifth and sixth pixels;
a fourth floating diffusion that is coupled between the seventh and eighth pixels, wherein the first and third floating diffusions are electrically connected and form a first charge storage node, wherein the second and fourth floating diffusions are electrically connected and form a second charge storage node, wherein, during charge summing operations in the array, charge from the first and fifth pixels is summed on the first charge storage node and charge from the third and seventh pixels is summed on the second charge storage node, and wherein each of the pixels has an associated transfer transistor that controls transfer of charge from that pixel onto a respective one of the floating diffusions;
a first control line that supplies a first transfer transistor control signal with which the transfer transistors of the first pixel and the third pixel are simultaneously controlled to transfer respective charges onto the first and second charge storage nodes.

9. The array defined in claim 8 further comprising a second control line that supplies a second transfer transistor control signal with which the transfer transistors of the second pixel and the fourth pixel are simultaneously controlled to transfer respective charges onto the first and second charge storage nodes.

10. The array defined in claim 9 further comprising a third control line that supplies a third transfer transistor control signal with which the transfer transistors of the fifth pixel and the seventh pixel are simultaneously controlled to transfer respective charges onto the first and second charge storage nodes.

11. The array defined in claim 9 further comprising a fourth control line that supplies a fourth transfer transistor control signal with which the transfer transistors of the sixth pixel and the eighth pixel are simultaneously controlled to transfer respective charges onto the first and second charge storage nodes.

12. The array defined in claim 11 further comprising:
a first source-follower transistor having a gate connected to the first charge storage node that receives summed pixel charges from the first charge storage node and a second source-follower transistor having a gate connected to the second charge storage node that receives summed pixel charges from the second charge storage node.

13. The array defined in claim 12 further comprising a first row select transistor connected to the first source-follower transistor and comprising a second row select transistor connected to the second source-follower transistor.

14. The array defined in claim 11 further comprising a first reset transistor coupled between the first charge storage node and a power supply line and a second reset transistor coupled between the second charge storage node and the power supply line.

15. A method of controlling image pixel charges in an array of image pixels having first and second pixels in a first row, third and fourth pixels in a second row, fifth and sixth pixels in a third row, seventh and eighth pixels in a fourth row, a first floating diffusion that is coupled between the first and second pixels, a second floating diffusion that is coupled between the third and fourth pixels, a third floating diffusion that is coupled between the fifth and sixth pixels, a fourth floating diffusion that is coupled between the seventh and eighth pixels, a first conductive line that electrically connects the first and third floating diffusions to form a first charge storage node, and a second conductive line that electrically connects the second and fourth floating diffusions to form a second charge storage node, comprising:
with a first control line, simultaneously controlling transfer gates associated with the first and third pixels to transfer respective pixel charges to the first and second charge storage nodes; and
with a second control line, simultaneously controlling transfer gates associated with the second and fourth pixels to transfer respective pixel charges to the first and second charge storage nodes
with a third control line, simultaneously controlling transfer gates associated with the fifth and seventh pixels to transfer respective pixel charges to the first and second charge storage nodes; and
with a fourth control line, simultaneously controlling transfer gates associated with the sixth and eighth pixels to transfer respective pixel charges to the first and second charge storage nodes.

16. The method defined in claim 15 further comprising:
in a mode in which charge summing is inactive, reading charge from the first pixel out of the first charge storage node at a first time and reading charge from the fifth pixel out of the first charge storage node at a second time that is different than the first time.

17. The method defined in claim 16 further comprising:
in a mode in which charge summing is active, reading charge from the first and fifth pixels out of the first charge storage mode at the same time.

* * * * *